UNITED STATES PATENT OFFICE.

SIEGFRIED KOHN, OF WESTFIELD, NEW JERSEY.

PIGMENT AND PROCESS FOR MAKING SAME.

1,231,617.  Specification of Letters Patent.  Patented July 3, 1917.

No Drawing.   Application filed July 18, 1916.   Serial No. 109,936.

*To all whom it may concern:*

Be it known that I, SIEGFRIED KOHN, a subject of the Emperor of Austria, residing at Westfield, in the county of Union and State of New Jersey, have invented certain new and useful Improvements in Pigments and Processes for Making Same; and I do hereby declare the following to be a full, clear, and exact description of the invention, such as will enable others skilled in the art to which it appertains to make and use the same.

My present invention has especial relation to dry and semi-dry pigments as well as to the process of manufacture employed in producing the same from certain salts of purpuric acid ($C_8H_5N_5O_6$). The composition of matter is adapted to use as a paint, varnish or printing ink, as for instance for printing wall papers, for which the semi-dry or "pulp" form is peculiarly fitted.

My process in its preferred form involves the addition of free alkali to a solution of an alkaline salt of purpuric acid, followed by the addition of a suitable soluble salt or salts of one or more metals. A precipitate is formed which varies in color according to the salts used, the proportions of reagents, the temperatures, etc.

The best mode of procedure which I have found involves the use of an ammonium salt of purpuric acid ($C_8H_4(NH_4)N_5O_6$) although it is within my invention to employ other alkalis in place of the ammonia.

As an example of a specific process involving my invention, the following may be stated as producing excellent results, and giving a concentrated dry or semi-dry pigment.

One part of the ammonium salt of purpuric acid is dissolved in from two to three hundred parts (preferably) of warm water—say at a temperature of eighty or ninety degrees Fahrenheit. To this is added from about 0.5 to 1.5 parts of concentrated ammonia, and when this has been thoroughly stirred through, there is added a solution containing from about 2.5 to 3.5 parts of metallic salt, for instance lead acetate.

The proportions are not essential, and the temperature also may be greatly varied according to the shade desired. When lead acetate is used a fine purplish red color is obtained. A salt of zinc gives a yellow pigment, and when mixed with other salts— as for instance with lead acetate, it provides a yellowish tinge or undertone. Tin salts lend brilliancy to the results.

Combinations of two or more soluble metallic salts may be used, and when so used in combination they may all be active in the sense of producing a pigmentous precipitate or one or more may act as a "carrier" to dilute and cheapen the resulting compound. Carriers are especially suitable in colors for printing wall papers.

Unless a certain proportion of carrier is desired care should be taken in mixing metallic salts for use in my process, since in some cases one metal will precipitate out by itself with the acid radical of the other metal. For instance lead acetate should not be used with aluminum sulfate because lead sulfate will be precipitated in addition to the precipitate formed by reaction with the salt of purpuric acid. If, however, a carrier is wanted, this process may be employed, the desired diluting agent being found in the lead sulfate.

It is to be understood that I do not limit myself to the proportions named, nor to the specific metallic salts which I have mentioned. A great variety of shades and colors, as well as specific adaptation to many different purposes may be obtained by various modifications of my process.

What I claim is:—

1. The process of producing a purple pigment which consists in adding lead acetate to a solution of an ammonium salt of purpuric acid containing free alkali.

2. The process of producing a purple pigment which consists in adding lead acetate to a warm aqueous solution of an ammonium salt of purpuric acid containing free alkali and separating the resulting precipitate.

3. The process of producing a pigment of the class described which consists in adding to a solution of a salt of an alkali-forming substance and purpuric acid a soluble metallic salt in presence of free alkali, and separating the resulting precipitate.

4. The process of producing a pigment of the class described which consists in adding to a solution of an ammonium salt of purpuric acid a soluble metallic salt in presence of free ammonia.

5. The process of producing a pigment of the class described which consists in adding to a solution of an ammonium salt of purpuric acid a plurality of soluble metallic salts and separating the precipitate resulting.

6. The process of producing a pigment of the class described which consists in adding to a solution of an ammonium salt of purpuric acid a plurality of soluble metallic salts one of which reacts to form with another such salt an insoluble precipitate in the nature of a carrier.

7. The process of producing a pigment of the class described which consists in dissolving one part of an ammonium salt of purpuric acid in from two to three hundred parts of heated water, adding a solution of from 0.5 to 1.5 of ammonia then adding from 2.5 to 3.5 parts of a soluble metallic salt in solution, and separating the resulting precipitate.

8. A pigment comprising the precipitate produced by adding a solution of a metallic salt to a solution of a salt of an alkali-forming substance and purpuric acid containing free alkali.

9. A purple pigment comprising the precipitate derived from the addition of lead acetate to a warm aqueous solution of an ammonium salt of purpuric acid containing free alkali.

In testimony whereof, I affix my signature.

SIEGFRIED KOHN.